(12) United States Patent
Willis et al.

(10) Patent No.: US 11,108,804 B2
(45) Date of Patent: Aug. 31, 2021

(54) PROVIDING SECURE INTER-VEHICLE DATA COMMUNICATIONS

(71) Applicant: BlackBerry Limited, Waterloo (CA)

(72) Inventors: Edward Snow Willis, Ottawa (CA); Christopher Scott Travers, Ottawa (CA); Conrad Delbert Seaman, Ottawa (CA)

(73) Assignee: BlackBerry Limited, Waterloo (CA)

( * ) Notice: Subject to any disclaimer, the term of this patent is extended or adjusted under 35 U.S.C. 154(b) by 637 days.

(21) Appl. No.: 15/906,615

(22) Filed: Feb. 27, 2018

(65) Prior Publication Data
US 2019/0268367 A1    Aug. 29, 2019

(51) Int. Cl.
*H04L 29/06* (2006.01)
*G06F 16/29* (2019.01)
*G06F 21/55* (2013.01)
*G06F 21/57* (2013.01)

(52) U.S. Cl.
CPC .......... *H04L 63/1433* (2013.01); *G06F 16/29* (2019.01); *G06F 21/554* (2013.01); *G06F 21/57* (2013.01); *H04L 63/1425* (2013.01)

(58) Field of Classification Search
CPC ........ G08G 1/166; G08G 1/163; G08G 1/161; G08G 1/0133; G08G 1/096775; H04L 67/12; H04L 63/1425; H04L 2209/84; H04W 4/46; H04W 4/44
See application file for complete search history.

(56) References Cited

U.S. PATENT DOCUMENTS

| | | | |
|---|---|---|---|
| 6,836,708 B2 * | 12/2004 | Tripathi | G07C 5/008 340/439 |
| 9,646,428 B1 * | 5/2017 | Konrardy | B60W 30/16 |
| 9,767,689 B1 | 9/2017 | Cain et al. | |
| 9,805,601 B1 * | 10/2017 | Fields | G08G 1/096844 |
| 9,940,834 B1 * | 4/2018 | Konrardy | G08G 1/161 |
| 9,946,531 B1 * | 4/2018 | Fields | G07C 5/0808 |
| 10,185,999 B1 * | 1/2019 | Konrardy | G07C 5/008 |

(Continued)

FOREIGN PATENT DOCUMENTS

EP    3232416    10/2017

OTHER PUBLICATIONS

Extended European Search Report issued in European Application No. 19157190.0, dated Jul. 4, 2019, 5 pages.
(Continued)

*Primary Examiner* — Tae K Kim
(74) *Attorney, Agent, or Firm* — Fish & Richardson P.C.

(57) ABSTRACT

Systems, methods, and software can be used to provide secure inter-vehicle data communications. In some aspects, a method, comprising: receiving, at a security server and from a hardware security processor connected to a system bus of a vehicle, security confidence data of the vehicle, wherein the security confidence data include at least one of version information of a software code executing on a component of the vehicle, diagnostic data information of the vehicle, or data traffic pattern information of the vehicle; determining, at the security server, a security confidence score of the vehicle; receiving, at the security server, a query from a different vehicle; and in response to the query, transmitting the confidence score of the vehicle to the different vehicle.

17 Claims, 3 Drawing Sheets

(56) References Cited

U.S. PATENT DOCUMENTS

| | | | |
|---|---|---|---|
| 10,748,419 B1* | 8/2020 | Fields | G08G 1/096791 |
| 10,991,242 B2* | 4/2021 | Taylor | G08G 1/096725 |
| 2012/0290146 A1* | 11/2012 | Dedes | G01C 21/3697 |
| | | | 701/1 |
| 2013/0179198 A1* | 7/2013 | Bowne | H04W 4/40 |
| | | | 705/4 |
| 2013/0250933 A1* | 9/2013 | Yousefi | B60R 16/023 |
| | | | 370/338 |
| 2015/0324576 A1* | 11/2015 | Quirant | H04L 9/005 |
| | | | 726/2 |
| 2016/0112206 A1* | 4/2016 | Cizas | H04L 9/3263 |
| | | | 713/158 |
| 2018/0301034 A1* | 10/2018 | Morita | G01C 21/3492 |
| 2019/0279440 A1* | 9/2019 | Ricci | H04W 4/48 |
| 2019/0371085 A1* | 12/2019 | Kishikawa | G07C 5/02 |
| 2020/0053112 A1* | 2/2020 | Torisaki | H04L 67/12 |
| 2021/0116256 A1* | 4/2021 | Konrardy | B60W 10/04 |

OTHER PUBLICATIONS

Machado et al., "Short Paper: Establishing trust in a vehicular network" 2013 IEEE Vehicular Networking Conference, IEEE, Dec. 16, 2013, 4 pages.

Communication under Rule 71 (3) EPC issued in European Application No. 19157190.0 on Sep. 28, 2020, 9 pages.

\* cited by examiner

PROVIDING SECURE INTER-VEHICLE DATA COMMUNICATIONS

TECHNICAL FIELD

The present disclosure relates to providing secure inter-vehicle data communications.

BACKGROUND

In some operations, vehicles can transmit data between one another. For example, one vehicle can transmit information about the traffic around the vehicle to another vehicle. This information can include environmental information such as streetlights, buildings, obstacles, cyclists, or pedestrians that are captured by the sensor of the vehicle, as well as the internal driving operation of the vehicle such as speed, acceleration, turning. The information can be used for the receiving vehicle to perform autopilot processing and generate autopilot or semi-autopilot commands for the receiving vehicle. A vehicle equipped with the autopilot processing platform can also be referred to as a self-driving vehicle, a driver-less vehicle, an autonomous or semi-autonomous vehicle, or an autopilot vehicle.

DESCRIPTION OF DRAWINGS

Like reference numbers and designations in the various drawings indicate like elements.

DETAILED DESCRIPTION

Figure 1:
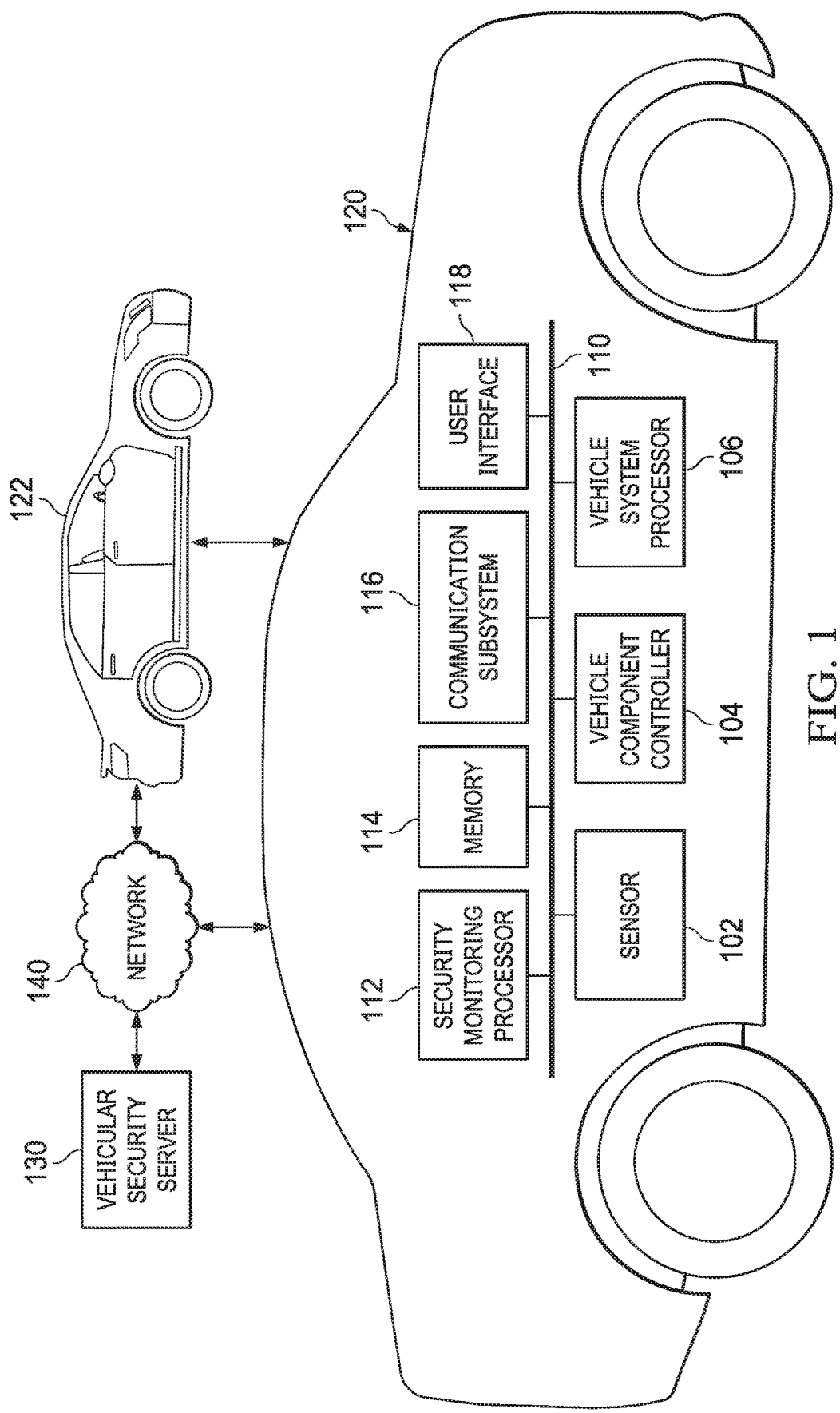
FIG. 1 is a schematic diagram showing an example communication system that provides secure inter-vehicle data communications, according to an implementation.

In some cases, inter-vehicle data communications can be performed using V2X communication protocols. V2X refers to communication between any two Intelligent Transportation Service (ITS) capable devices. An ITS capable device can be, for example, a vehicle, pedestrian, animal, cyclist, or road side unit (RSU). V2X can also include communication between a vehicle and any other Intelligent Transportation Service (ITS) capable device, including, for example, Vehicle to Vehicle (V2V), Vehicle to Pedestrian (V2P), Vehicle to Infrastructure (V2I), or Vehicle to Network (V2N) communications. V2X enables transport entities, such as vehicles, roadside infrastructure, associated application servers, and pedestrians to obtain and share information regarding their local environment in order to process and share knowledge for more intelligent transport related services or applications, for example, cooperative route planning, cooperative collision warning, or autonomous driving. In some cases, the terms V2X and V2V may be used interchangeably, to refer to services provided to a user equipment for communication supporting vehicle oriented services. Examples of vehicle oriented services include road safety, (transport) traffic efficiency, and other application services. One will appreciate that the terminology in this disclosure is directed at communications between vehicles, intelligent transport service capable devices, roadside units, pedestrians, and etc. However, the technology is also applicable to other types of transportation systems, their infrastructure and passengers, e.g., trains, track side signaling, passengers, aerial vehicles, drones etc., and vehicles that can communicate with trackside signaling, e.g., cars at level crossings etc.

In a V2X communication system, one compromised endpoint can potentially affect all other endpoints with which it communicates by sending erroneous information to these other endpoints. This erroneous information can lead other endpoints (e.g., other vehicles) to make erroneous autopilot decisions, and thus endanger driving safety of the road.

In some implementations, a hardware security processor can be implemented on an endpoint. The processor can monitor the data traffic on a system bus of the endpoint and generate security confidence data of the endpoint. The processor can report the security confidence data to a security server, which determines a security confidence score of the endpoint. Other endpoints communicating with the endpoint can query the security server for the security confidence score, and use the security confidence score to determine the level of trustworthiness of the data it receives in V2X communication with the endpoint. Therefore, a vehicle can discard information from another vehicle that has a high risk of being compromised, while using information from vehicles that have low risks of being compromised, in generating autopilot commands. Such operations would improve the driving safety of the vehicle and the overall traffic system. FIGS. 1-4 and associated descriptions provide additional details of these implementations.

FIG. 1 is a schematic diagram showing an example communication system 100 that provides secure inter-vehicle data communications, according to an implementation. At a high level, the example communication system 100 includes a first vehicle 120 and a second vehicle 122 that are communicatively coupled with a vehicular security server 130, over a network 140.

Figure 2:
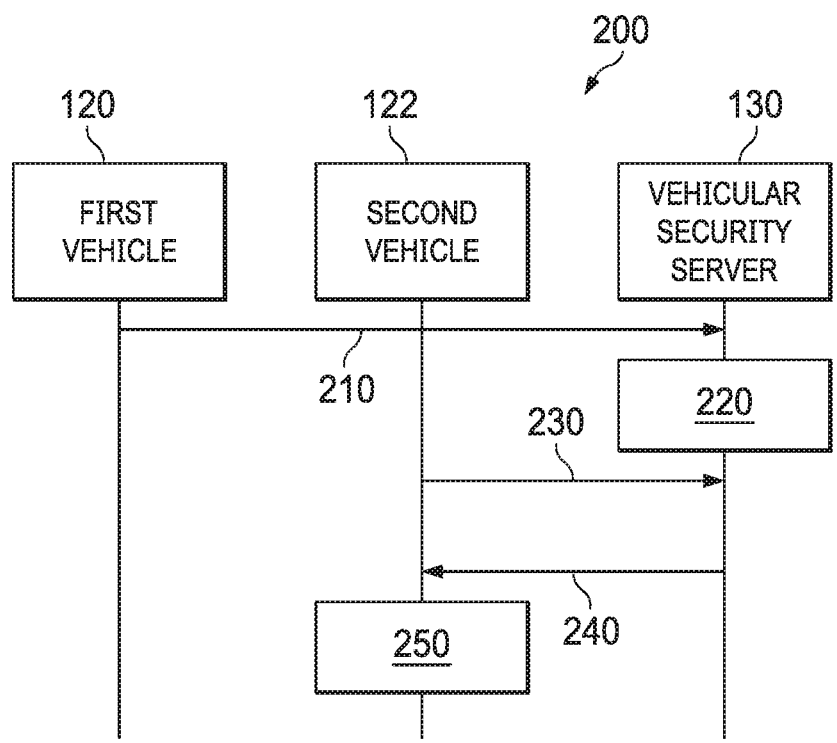
FIG. 2 is a flow diagram showing an example process for providing secure inter-vehicle data communications, according to an implementation.
Figure 3:
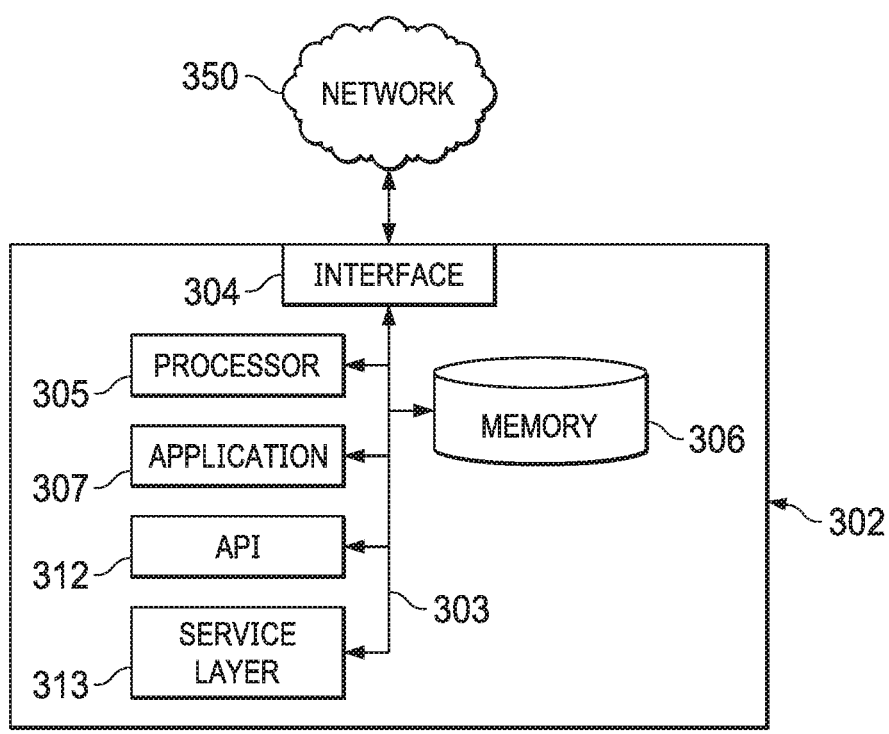
FIG. 3 is a high-level architecture block diagram showing a server coupled with a network, according to an implementation.
Figure 4:
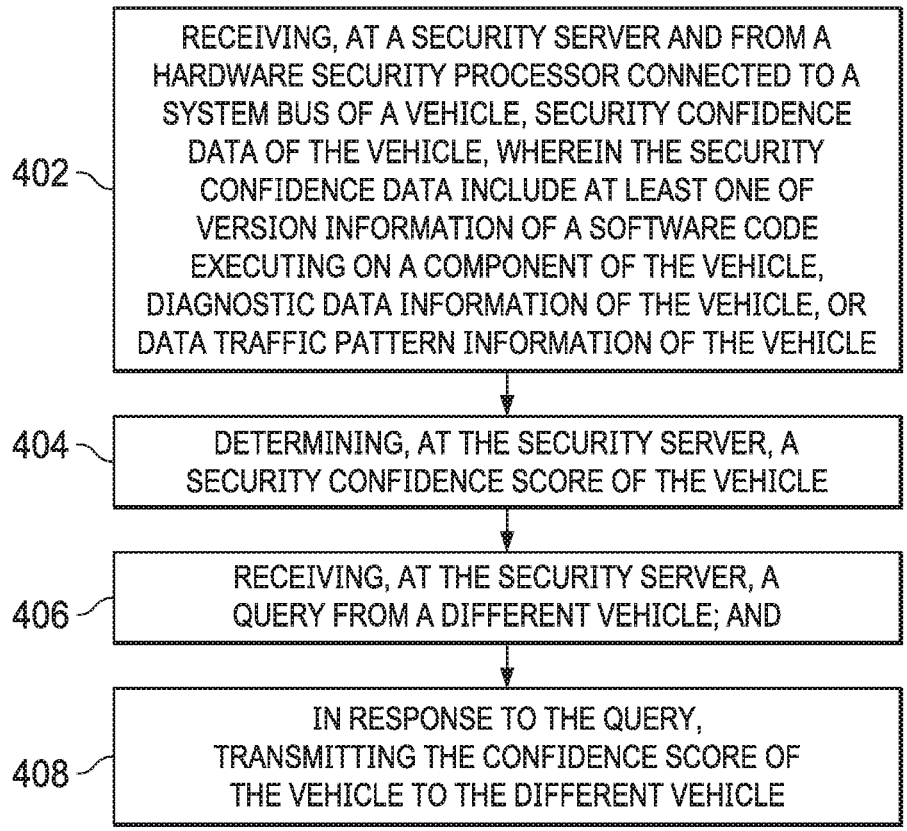
FIG. 4 is a flow diagram showing an example method for providing secure inter-vehicle data communications, according to an implementation.

The vehicular security server 130 represents an application, a set of applications, software, software modules, hardware, or any combination thereof that can be configured to manage inter-vehicle communications for the first vehicle 120 and the second vehicle 122. The vehicular security server 130 can be configured to managed inter-vehicle communications for additional vehicles. The vehicular security server 130 stores and analyzes security confidence data reported by different vehicles. The vehicular security server 130 also determines the security confidence score of each vehicle based on the security confidence data reported by the vehicle. In addition, the vehicular security server 130 provides the security confidence data of a vehicle in response to inquiries from other vehicles. FIGS. 2-4 and associated descriptions provide additional details of these implementations.

The example communication system 100 includes the network 140. The network 140 represents an application, set of applications, software, software modules, hardware, or combination thereof, that can be configured to transmit data messages between the entities in the system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

A vehicle, e.g., the first vehicle 120 and the second vehicle 122, can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the first vehicle 120 includes a sensor 102, a vehicle component controller 104, a vehicular system processor 106, a communication subsystem 116, a user interface 118, memory 114, and a security monitoring processor 112 that are connected to a bus 110. The second vehicle 122, though not illustrated, can have the similar components as the first vehicle 120.

The first vehicle 120 includes a sensor 102. Although illustrated as a single sensor 102 in FIG. 1, the first vehicle 120 can include two or more sensors 102. The sensor 102 can include any device that detects or measures information for the first vehicle 120. For example, the sensor 102 can include devices that capture environmental information that is external to the first vehicle 120, such as microphones, cameras, radars, laser transmitters and receivers, or the like. These sensors can provide environmental inputs for a driving processing platform operating on the first vehicle 120 to make autopilot decisions. The sensor 102 can also include devices that capture information that is internal to the first vehicle 120, such as monitors for components such as engine, battery, fuel, electronic system, cooling systems and the like. These sensors can provide operation status and warnings to the driving processing platform operating on the first vehicle 120.

The first vehicle 120 includes a vehicle component controller 104. Although illustrated as a vehicle component controller 104 in FIG. 1, the first vehicle 120 can include two or more vehicle component controllers 104. The vehicle component controller 104 represents a controller that controls the operation of a component on the first vehicle 120. Examples of the components can include engine, accelerator, brake, radiator, battery, steering wheel, transmission system, cooling system, electrical system, or any other components of the on the first vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the driving processing platform operating on the first vehicle 120. Generally, the vehicular system processor 106 executes instructions and manipulates data to perform the operations of the driving processing platform. The vehicular system processor 106 can receive inputs from the sensor 102 and generates commands to the vehicle component controller 104. In some cases, the vehicular system processor 106 can perform autopilot operations. In some cases, the vehicular system processor 106 can include a data processing apparatus.

The communication subsystem 116 can be configured to provide wireless or wireline communication for data or control information provided by the vehicular system processor 106, the security monitoring processor 112, or both. For example, the communication subsystem 116 can support transmissions over wireless local area network (WLAN or WiFi), near field communication (NFC), infrared (IR), Radio-frequency identification (RFID), bluetooth (FT), Universal Serial Bus (USB), or any other short range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver. The communication subsystem 116 can be support inter-vehicle communication protocols, for example V2X communication protocols, to communicate with other vehicles, e.g., the second vehicle 122. The communication subsystem 116 can also support communication protocols for transmitting data over the network 140.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the first vehicle 120 and various other computer-executable software programs for performing one or more of the processes, steps, or actions described above.

The security monitoring processor 112 is a hardware processor that monitors security on the first vehicle 120. The security monitoring processor 112 can monitor data exchanged on the bus 110, including data related to software updates, diagnostic reports, and other data traffic that is transmitted between the components of the driving processing platform operating on the first vehicle 120. The security monitoring processor 112 can report security confidence data, using the communication subsystem 116, to the vehicular security server 130. FIGS. 2-4 and associated descriptions provide additional details of these implementations. The security monitoring processor 112 can include a data processing apparatus. In some cases, the security monitoring processor 112 can be implemented on a hardware security module (HSM). The HSM stores digital keys for authentication and encryption, and thus protects the security monitoring processor 112 from being tempered with by potential intruders.

As illustrated, the bus 110 provides a communication interface for components of the driving processing platform operating on the first vehicle 120. In some cases, the bus 110 can be implemented using a Controller Area Network (CAN) bus.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example process 200 for providing secure inter-vehicle data communications, according to an implementation. The process 200 can be implemented by the first vehicle 120 (including the components of the first vehicle 120, for example, the security monitoring processor 112), the second vehicle 122, and the vehicular security server 130, as shown in FIG. 1. The process 200 shown in FIG. 2 can also be implemented using additional, fewer, or different entities. Furthermore, the process 200 shown in FIG. 2 can also be implemented using additional, fewer, or different operations, which can be performed in the order shown or in a different order. In some instances, an operation or a group of the operations can be iterated or repeated, for example, for a specified number of iterations or until a terminating condition is reached.

The example process 200 begins at 210, wherein the first vehicle 120 reports security confidence data of the first vehicle 120 to the vehicular security server 130. The security confidence data includes version information of software codes executing on the components of the first vehicle 120, diagnostic data information of the first vehicle 120, data traffic pattern information of the first vehicle 120, or any combinations thereof.

The version information of software codes executing on the components of the first vehicle 120 can include the software version number of different software components of the first vehicle 120. These software components can include software modules of one or more sensors of the first vehicle 120, software modules of one or more controllers of the first vehicle 120, software modules of one or more processors of the first vehicle 120, software modules of other components such as communication subsystems or user interfaces of the of the first vehicle 120. Examples of the software modules can include drivers and applications.

In some operations, the version information discussed above can be collected by a security monitoring processor, e.g., the security monitoring processor 112 as shown in FIG. 1. For example, the security monitoring processor can monitor the data communication on a system bus of the vehicle (for example, the bus 110 as shown in FIG. 1). Before a new software, or an updated software of a component module is to be installed on the first vehicle 120, metadata of the new or updated software can be transmitted on the system bus. The metadata can include the version number of the software and the module identity (ID) that the software is to be installed on. The security monitoring processor 112 can record the metadata before the software is installed. Alternatively, or in combination, the security monitoring processor 112 can send a query for the version number of a software module to the software module or to a system software register of the first vehicle 120. In response, the security monitoring processor 112 can receive a response and determines the version number of the software module accordingly.

The diagnostic data information of the first vehicle 120 can include information of error reports, warnings, status updates, and other diagnostic reports that are transmitted between components of the first vehicle 120. In some cases, the diagnosis reports are transmitted from software modules executing on a component of the first vehicle 120 (for example a breaker controller or a gas monitor) to the vehicle system processor of the first vehicle 120 via the system bus. The security monitoring processor can monitor the system bus and record information of these diagnostic reports. The information of these diagnostic reports can include the types, the module IDs of the components that generated the reports, the timestamps of the reports, the contents of the reports, or any combinations thereof.

The data traffic pattern information of the first vehicle 120 includes information of the messages that are transmitted between the components of the first vehicle 120. The information of the messages can include frequencies of the messages, sizes of the messages, module IDs of the components that receive or transmit the messages, and other metadata information of the messages. The security monitoring processor can monitor the system bus and record the data traffic pattern information.

In some cases, the security monitoring processor can report security confidence data periodically. For example, the reporting period can be configured by a manufacturer of the first vehicle 120, a user of the first vehicle 120, a security administrator of the first vehicle 120, the vehicular security server 130, or any other entity that manages software security of the first vehicle 120. The security monitoring processor can store the security confidence data it collected and transmit the data to the vehicular security server 130 using a communication subsystem of the first vehicle 120. In some cases, different reporting periods can be configured for different types of security confidence data (e.g., version information, diagnostic data information, and data traffic pattern information).

Alternatively, or in combination, the security confidence data can be reported based on trigger events. Examples of trigger events can include: a new software update, a presence of a specific type of diagnosis report, the traffic pattern of the inter-module messages meeting a configured condition. In some cases, the trigger events can be configured by a manufacturer of the first vehicle 120, a user of the first vehicle 120, a security administrator of the first vehicle 120, the vehicular security server 130, or any other entity that manages software security of the first vehicle 120. In some cases, the security confidence data can be reported in response to a query from the vehicular security server 130. For example, the vehicular security server 130 can transmit a security confidence data request to the first vehicle 120, and receive the security confidence data from the first vehicle 120 in response.

Different types of the security confidence data (e.g., version information, diagnostic data information, and data traffic pattern information) can be transmitted together in the same message, or transmitted individually in separate messages at different times.

At 220, the vehicular security server 130 determines a security confidence score of the first vehicle 120 based on the received security confidence data. The security confidence score indicates the security level of the software modules on the first vehicle 120. The security confidence score can be calculated based on one or more factors. One example factor is a version factor that is determined based on the received version information of software codes executing on the first vehicle 120. In some cases, software codes may be vulnerable to certain known attacks. To protect against these attacks, bug fixes and security updates may be incorporated in the latest update of the software package. Therefore, the version number of a software module can indicate the security level of the software. The vehicular security server 130 may assign a low value to the version factor if an old and out-of-date version of the software module is currently executing on the first vehicle 120.

Another example factor is a diagnostic data factor that is determined based on the received diagnostic data information of the first vehicle 120. In some cases, software modules that are compromised by malicious attacks can generate error reports or other diagnostic reports. Thus, the vehicular security server 130 may assign a low value to the diagnostic data factor if the received diagnostic data information indicates presences of such error reports.

Another example factor is a data traffic factor that is determined based on the received data traffic pattern information of the first vehicle 120. In some cases, software modules that have been compromised by malicious attacks may exhibit abnormal data traffic pattern. In one example, a malicious attacker may attempt to use malware to overwrite software modules operating one or more sensors of the first vehicle 120, in order to embed codes that would send information obtained by the sensors. The malware may generate an unusually high number of writing attempts and cause an unusually high number of writing rejections. In another example, a Denial of Service (DoS) attack may result in an unusually high number of messages for a software module controlling one particular component on the first vehicle 120. Therefore, the vehicular security server 130 can analyze the data traffic pattern information, and determine whether the data traffic pattern on the first vehicle 120 resembles a normal operating pattern of the software system on a vehicle or a software system that is under attack. The vehicular security server 130 can assign a data traffic factor based on the analysis.

In some cases, the vehicular security server 130 can assign these factors based on information from other vehicles. For example, the vehicular security server 130 receives data traffic pattern information from multiple vehicles. The vehicular security server 130 can store them in a database and compile them to develop a common pattern of systems operating under a normal condition. The vehicular security server 130 can compare the data traffic pattern information received from the first vehicle 120 with the common pattern and assign the data traffic factor based on the amount and type of deviations between the common pattern and the data traffic pattern of the first vehicle 120.

In some cases, each factor may be determined collectively, based on information of software modules executing on different components of the first vehicle 120. For example, the vehicular security server 130 can assign a version sub-factor based on the version number of software module for each component of the first vehicle 120. The vehicular security server 130 can calculate the version factor by taking an average, a weighted average, or the lowest version sub-factor of these version sub-factors.

The vehicular security server 130 calculates the security confidence score based on these factors. For example, the security confidence score can be an average, a weighted average, or the lowest value of these factors.

At 230, the second vehicle 122 transmits a query to the vehicular security server 130 for the security confidence score of the first vehicle 120. The query includes identification of the first vehicle 120, e.g., the license plate information of the first vehicle 120. In some cases, the second vehicle 122 initiates the query before it engages in an inter-vehicle data communication with the first vehicle 120. Alternatively, or in combination, the second vehicle 122 initiates the query after it receives an inter-vehicle data communication from the first vehicle 120.

At 240, the vehicular security server 130 transmits a security confidence score of the first vehicle 120 to the second vehicle 122. In some cases, instead of sending the security confidence score, the vehicular security server 130 can send a security indicator that is less fine-grained than the security confidence score. For example, the security indicator can take one of two values indicating "secure," or "not secure."

In some cases, instead of performing the step 220 prior to the step 230, the step 220 can be performed after the step 230. In other words, the vehicular security server 130 can calculate the security confidence score in response to a query from a different vehicle.

At 250, the second vehicle 122 determines whether to engage in inter-vehicle data communication based on the security confidence score or the security indicator received at 240. In some cases, a threshold is configured at the second vehicle 122. In some cases, the threshold can be configured by a manufacturer of the second vehicle 122, a user of the second vehicle 122, a security administrator of the second vehicle 122, the vehicular security server 130, or any other entity that manages software security of the second vehicle 122. If the score is lower than the threshold, then the second vehicle 122 would not engage in inter-vehicle data communication with the first vehicle 120. If the score is higher than the threshold, then the second vehicle 122 would engage in inter-vehicle data communication with the first vehicle 120.

In some cases, different thresholds can be configured for different types of inter-vehicle data communications. For example, for messages related to road traffic information, the threshold can be low or zero. The second vehicle 122 can receive and use traffic information reported by the first vehicle 120 even if the first vehicle 120 may not be secure. On the other hand, for messages related to auto-driving inputs, the threshold can be high. The second vehicle 122 can discard such messages from the first vehicle 120 if the security confidence data indicates a presence of security risk of the first vehicle 120.

FIG. 3 is a high-level architecture block diagram showing a server 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the server 302 and other devices. The network 350 can be a wireless or a wireline network, a memory pipe, a hardware connection, or any internal or external communication paths between the components.

The server 302 includes a computing system configured to perform the algorithm described in this disclosure to process resource requests. For example, the server 302 can be used to implement the vehicular security server 130 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the server 302 can include a standalone Linux system that runs batch applications. In some cases, the server 302 can include mobile or personal computers that run the application program.

The server 302 may include an input device, such as a keypad, keyboard, touch screen, microphone, speech recognition device, or another device that can accept user information, and/or an output device that conveys information associated with the operation of the server 302, including digital data, visual and/or audio information, or a GUI.

The server 302 can serve as a client, network component, a server, a database or other persistency, or the like. In some implementations, one or more components of the server 302 may be configured to operate within a cloud-computing-based environment.

At a high level, the server 302 is an electronic computing device operable to receive, transmit, process, store, or manage data and information. According to some implementations, the server 302 may also include or be communicably coupled with an application server, e-mail server, web server, caching server, streaming data server, business intelligence (BI) server, and/or other server.

The server 302 can receive requests over network 350 from a client application (e.g., executing on a user device) and respond to the received requests by processing said requests in an appropriate software application. In addition, requests may also be sent to the server 302 from internal users (e.g., from a command console or by another appropriate access method), external or third parties, other automated applications, as well as any other appropriate entities, individuals, systems, or computers.

Each of the components of the server 302 can communicate using a system bus 303. In some implementations, any and/or all the components of the server 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the server 302. The functionality of the server 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the server 302, alternative implementations may illustrate the API 312 and/or the service layer 313 as stand-alone components in relation to other components of the server 302. Moreover, any or all parts of the API 312 and/or the service layer 313 may be implemented as child or sub-modules of another software module or hardware module, without departing from the scope of this disclosure.

The server 302 includes an interface 304. Although illustrated as a single interface 304 in FIG. 3, two or more interfaces 304 may be used according to particular needs, configurations, or particular implementations of the server 302. The interface 304 is used by the server 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The server 302 includes a processor 305. Although illustrated as a single processor 305 in FIG. 3, two or more processors may be used according to particular needs, configurations, or particular implementations of the server 302. Generally, the processor 305 executes instructions and manipulates data to perform the operations of the server 302. In some cases, the processor 305 can include a data processing apparatus.

The server 302 also includes a memory 306 that holds data for the server 302. Although illustrated as a single memory 306 in FIG. 3, two or more memories may be used according to particular needs, configurations, or particular implementations of the server 302. While memory 306 is illustrated as an integral component of the server 302, in alternative implementations, memory 306 can be external to the server 302.

The application 307 comprises an algorithmic software engine providing functionality according to particular needs, configurations, or particular implementations of the server 302. Although illustrated as a single application 307, the application 307 may be implemented as multiple applications 307 on the server 302. In addition, although illustrated as integral to the server 302, in alternative implementations, the application 307 can be external to the server 302.

Further, the terms "client," "user," and other appropriate terminology may be used interchangeably, as appropriate, without departing from the scope of this disclosure. Moreover, this disclosure contemplates that many users may use one server 302, or that one user may use multiple servers 302.

FIG. 4 is a flow diagram showing an example method 400 for providing secure inter-vehicle data communications, according to an implementation. The method 400 can be implemented by the entities shown in FIG. 1, including, for example, the vehicular security server 130. The method 400 shown in FIG. 4 can also be implemented using additional, fewer, or different entities. Furthermore, the method 400 shown in FIG. 4 can be implemented using additional, fewer, or different operations, which can be performed in the order shown or in a different order. In some instances, an operation or a group of operations can be iterated or repeated, for example, for a specified number of iterations or until a terminating condition is reached.

At 402, a security server receives, from a hardware security processor connected to a system bus of a vehicle, security confidence data of the vehicle. The security confidence data include at least one of version information of a software code executing on a component of the vehicle, diagnostic data information of the vehicle, or data traffic pattern information of the vehicle.

At 404, the security server determines a security confidence score of the vehicle. At 406, the security server receives a query from a different vehicle. At 408, in response to the query, the security server transmits the confidence score of the vehicle to the different vehicle.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A computer-implemented method, comprising:
receiving, at a security server and from a hardware security processor connected to a system bus of a vehicle, security confidence data of the vehicle, wherein the security confidence data include data traffic pattern information of the vehicle, and wherein data traffic pattern information comprises information of frequencies or sizes of data exchanged between components connected to the system bus, and the hardware security processor is installed on the vehicle and is implemented on a hardware security module (HSM) that stores digital keys for authentication and encryption;
determining, at the security server, a security confidence score of the vehicle, wherein the determining the security confidence score comprises:
determining a version factor based on version information of a software code executing on a component of the vehicle;
determining a diagnostic data factor based on diagnostic data information of the vehicle;
determining a data traffic factor based on the data traffic pattern information; and
calculating the security confidence score based on the version factor, the diagnostic data factor, and the data traffic factor;
receiving, at the security server, a query from a different vehicle; and
in response to the query, transmitting the confidence score of the vehicle to the different vehicle.

2. The method of claim 1, wherein the determining the security confidence score of the vehicle comprises:
comparing the data traffic pattern information of the vehicle with stored data traffic patterns; and
determining the data traffic factor based on the comparing.

3. The method of claim 1, wherein the version information of the software code is recorded by the hardware security processor before the software code is installed on the component.

4. The method of claim 1, further comprising:
transmitting a security confidence data request to the hardware security processor;
wherein the security confidence data is received in response to the security confidence data request.

5. The method of claim 1, wherein the security confidence data is received periodically.

6. The method of claim 1, wherein the security confidence score of the vehicle is determined based on other security confidence data received from other vehicles.

7. A security server, comprising:
at least one hardware processor; and
a computer-readable storage medium coupled to the at least one hardware processor and storing programming instructions for execution by the at least one hardware processor, wherein the programming instructions, when executed, cause the at least one hardware processor to perform operations comprising:
receiving, at the security server and from a hardware security processor connected to a system bus of a vehicle, security confidence data of the vehicle, wherein the security confidence data include data traffic pattern information of the vehicle, and wherein data traffic pattern information comprises information of frequencies or sizes of data exchanged between components connected to the system bus, and the hardware security processor is installed on the vehicle and is implemented on a hardware security module (HSM) that stores digital keys for authentication and encryption;
determining, at the security server, a security confidence score of the vehicle, wherein the determining the security confidence score comprises:
determining a version factor based on version information of a software code executing on a component of the vehicle;
determining a diagnostic data factor based on diagnostic data information of the vehicle;
determining a data traffic factor based on the data traffic pattern information; and
calculating the security confidence score based on the version factor, the diagnostic data factor, and the data traffic factor;
receiving, at the security server, a query from a different vehicle; and
in response to the query, transmitting the confidence score of the vehicle to the different vehicle.

8. The security server of claim 7, wherein the determining the security confidence score of the vehicle comprises:
comparing the data traffic pattern information of the vehicle with stored data traffic patterns; and
determining the data traffic factor based on the comparing.

9. The security server of claim 7, wherein the version information of the software code is recorded by the hardware security processor before the software code is installed on the component.

10. The security server of claim 7, the operations further comprising:
transmitting a security confidence data request to the hardware security processor;
wherein the security confidence data is received in response to the security confidence data request.

11. The security server of claim 7, wherein the security confidence data is received periodically.

12. The security server of claim 7, wherein the security confidence score of the vehicle is determined based on other security confidence data received from other vehicles.

13. A non-transitory computer-readable medium storing instructions which, when executed, cause a computing device to perform operations comprising:
receiving, at a security server and from a hardware security processor connected to a system bus of a vehicle, security confidence data of the vehicle, wherein the security confidence data include data traffic pattern information of the vehicle, and wherein data traffic pattern information comprises information of frequencies or sizes of data exchanged between components connected to the system bus, and the hardware security processor is installed on the vehicle and is implemented on a hardware security module (HSM) that stores digital keys for authentication and encryption;

determining, at the security server, a security confidence score of the vehicle, wherein the determining the security confidence score comprises:

determining a version factor based on version information of a software code executing on a component of the vehicle;

determining a diagnostic data factor based on diagnostic data information of the vehicle;

determining a data traffic factor based on the data traffic pattern information; and calculating the security confidence score based on the version factor, the diagnostic data factor, and the data traffic factor;

receiving, at the security server, a query from a different vehicle; and in response to the query, transmitting the confidence score of the vehicle to the different vehicle.

14. The computer-readable medium of claim 13, wherein the determining the security confidence score of the vehicle comprises:

comparing the data traffic pattern information of the vehicle with stored data traffic patterns; and determining the data traffic factor based on the comparing.

15. The computer-readable medium of claim 13, wherein the version information of the software code is recorded by the hardware security processor before the software code is installed on the component.

16. The computer-readable medium of claim 13, the operations further comprising:

transmitting a security confidence data request to the hardware security processor; wherein the security confidence data is received in response to the security confidence data request.

17. The computer-readable medium of claim 13, wherein the security confidence data is received periodically.

* * * * *